(12) United States Patent
Szarvas et al.

(10) Patent No.: US 7,835,048 B2
(45) Date of Patent: Nov. 16, 2010

(54) HOLOGRAPHIC STORAGE SYSTEM WITH MULTIPLE REFERENCE BEAMS

(75) Inventors: Gabor Szarvas, Budapest (HU);
Szabolcs Kautny, Budapest (HU);
Krisztian Banko, Ajka (HU); Zoltan Karpati, Pecs (HU)

(73) Assignee: Thomson Licensing, Boulogne-Billancourt (FR)

( * ) Notice: Subject to any disclaimer, the term of this patent is extended or adjusted under 35 U.S.C. 154(b) by 406 days.

(21) Appl. No.: 11/973,126

(22) Filed: Oct. 5, 2007

(65) Prior Publication Data

US 2008/0088898 A1    Apr. 17, 2008

(30) Foreign Application Priority Data

Oct. 13, 2006    (EP)    ............... 06122233

(51) Int. Cl.
*G03H 1/16*    (2006.01)
(52) U.S. Cl. .................................. 359/10; 359/29
(58) Field of Classification Search .............. 359/1–35; 372/92–108; 369/103
See application file for complete search history.

(56) References Cited

U.S. PATENT DOCUMENTS

| | | | |
|---|---|---|---|
| 5,369,511 A * | 11/1994 | Amos ........................ | 359/15 |
| 6,281,993 B1 | 8/2001 | Bernal et al. | |
| 6,762,865 B1 | 7/2004 | Edwards | |
| 2003/0025955 A1 | 2/2003 | Curtis | |
| 2003/0039001 A1 | 2/2003 | King et al. | |
| 2004/0156297 A1 | 8/2004 | Edwards | |
| 2005/0078592 A1 | 4/2005 | Horimai et al. | |
| 2006/0082851 A1 | 4/2006 | Toishi | |
| 2007/0153663 A1 | 7/2007 | Fukumoto et al. | |
| 2009/0103152 A1* | 4/2009 | Szarvas et al. ................ | 359/10 |
| 2009/0262405 A1* | 10/2009 | Szarvas et al. ................ | 359/10 |

FOREIGN PATENT DOCUMENTS

| | | |
|---|---|---|
| EP | 1 624 451 A1 | 2/2006 |
| WO | WO 2005/066939 A2 | 7/2005 |
| WO | WO 2006/003077 A1 | 1/2006 |

OTHER PUBLICATIONS

European Search Report dated May 8, 2007.

* cited by examiner

*Primary Examiner*—Stephone B Allen
*Assistant Examiner*—Jennifer L. Doak
(74) *Attorney, Agent, or Firm*—Robert D. Shedd; Joseph J. Opalach; Jerome C. Schaefer (57) ABSTRACT

The present invention relates to a coaxial type apparatus for reading from and/or writing to holographic storage media with multiple reference beams. The invention further relates to a beam generator and a filter for use in such an apparatus. According to the invention, in an apparatus for reading from and/or writing to a holographic storage medium, with a coaxial arrangement of three or more focused reference beams and an object beam or a reconstructed object beam, the foci of the focused reference beams are arranged on a circle around the object beam in a Fourier plane of the apparatus. A beam generator generates the three or more reference beams from an incoming reference beam. A filter low-pass filters the object beam and rotates the polarization of the three or more reference beams.

14 Claims, 6 Drawing Sheets

HOLOGRAPHIC STORAGE SYSTEM WITH MULTIPLE REFERENCE BEAMS

This application claims the benefit, under 35 U.S.C. §119 of European Patent Application 06122233.7, filed Oct. 13, 2006.

FIELD OF THE INVENTION

The present invention relates to an apparatus for reading from and/or writing to holographic storage media, and more specifically to a coaxial type apparatus for reading from and/or writing to holographic storage media with multiple reference beams. The invention further relates to a beam generator and a filter for use in such an apparatus.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

EP 1 624 451 discloses a holographic storage system with a coaxial arrangement, where a plurality of reference beams are arranged around the object beam. According to this solution the object beam and the reference beams are coupled in and out at the object plane and the image plane, respectively. This arrangement is a so-called split aperture arrangement, because the aperture of the Fourier objective is split into an object part and a reference part. The arrangement has the advantage of being circularly symmetric. The selectivity and also the interhologram crosstalk are the same in every direction in the plane of the holograms. However, half of the aperture of the Fourier objective is used for the reference beams. This means that the capacity of a single hologram of the split aperture system is only half of the capacity of a common aperture arrangement. In addition, a total overlap of the object beam and the reference beams occurs only in the Fourier plane. The overlap is only partial within a 100-200 μm thick layer in the holographic storage medium. This value depends on the diameter of the hologram and the numerical aperture of the Fourier objective. Starting at a distance of about 200-400 μm from the Fourier plane there is no overlap at all.

In WO2006/003077 a 12 f reflection type coaxial holographic storage arrangement with three confocally arranged Fourier planes is shown. In this arrangement the object beam and the reference beams are coupled in and out at the first and third Fourier planes, respectively. The reference beams are small spots in these planes. More precisely, they form diffraction patterns, similar to the Airy pattern. This arrangement is a so-called common aperture arrangement, because at the object plane and the image plane the object beam and the reference beams fill out the same area of the aperture. The beams fill out the entire aperture of the objectives. The disclosed arrangement allows to apply shift multiplexing, reference scanning multiplexing, phase coded multiplexing, or a combination of these multiplexing schemes. The reference beams are a pair (or pairs of) half cone shaped beams. The tips of the pair or pairs of half cone shaped reference beams form two lines along a diameter at the Fourier planes of the object beam.

Theoretically, for infinite holograms the shift selectivity curve is a sinc(x) like function. See, for example, G. Barbastathis et al.: "Shift multiplexing with spherical reference waves", Appl. Opt. 35, pp 2403-2417. At the so-called Bragg distances the diffraction efficiencies of the shifted hologram are zero. In WO2006/003077 the distances between the tips of the reference beams along the two lines correspond to these Bragg distances. The interhologram crosstalk between the multiplexed holograms in theory is negligible at the Bragg distances. Assuming infinite diameter holograms there are selective and non-selective directions for the shift multiplexing. See again the article of G. Barbastathis et al. The selective direction is the direction of the line formed by the tips of the reference beams. In the so-called non-selective direction, which is orthogonal to the selective direction in the plane of the holograms, the shift distance is infinite. However, in a real storage system the volume of the hologram is finite. Practically, the order of magnitude of the hologram volume is about $(0.4-0.6) \times (0.4-0.6) \times (0.2-0.6) mm^3$. Detailed investigations have shown that there are large discrepancies between the shift selectivity curves of infinite and finite holograms. There are no Bragg distances in case of finite volume holograms. See Z. Karpati et al.: "Shift Selectivity Calculation for Finite Volume Holograms with Half-Cone Reference Beams", Jap. J. Appl. Phys., Vol. 45 (2006), pp 1288-1289. Using finite volume holograms the order of magnitude of the selectivity is similar in both directions. See, for example, Z. Karpati et al.: "Selectivity and tolerance calculations with half-cone reference beam in volume holographic storage", J. Mod. Opt., Vol. 53 (2006), pp 2067-2088. The presence of selectivity in both directions allows two-dimensional multiplexing. A problem is that the interhologram cross-talk is too high in the non-selective direction. This limits the achievable number of multiplexed holograms in this direction, and as a consequence limits the total capacity of the holographic storage medium.

SUMMARY OF THE INVENTION

It is an object of the invention to propose an apparatus for reading from and/or writing to a holographic storage medium with an improved selectivity.

According to the invention, this object is achieved by an apparatus for reading from and/or writing to a holographic storage medium, with a coaxial arrangement of three or more focused reference beams and an object beam or a reconstructed object beam, in which the foci of the focused reference beams are arranged around the object beam in a Fourier plane of the apparatus, e.g. on a circle or an ellipse.

The interhologram crosstalk is equalized in both directions by applying more than two reference beams. The tips of the reference beams are arranged on a circle or ellipse around the object beam in the Fourier plane. In case of a circle the shift distance is the same in X- and Y-direction, whereas it is different in both directions in case of an ellipse. At least three reference beams are used, equally distributed around a Fourier filter aperture. In a geometrical optical point of view the reference beams in this plane are single spots, or more precisely they are diffraction patterns with a huge peak intensity in the center. The tips or intensity peaks of the reference beams are aligned along a circle or ellipse around the filter. The circle or ellipse is centered relative to the aperture of the Fourier filter, and has a diameter a few 10 µm larger than the diameter of the Fourier filter. This larger diameter allows to couple the reference beams and the object beam in and out of the optical system, e.g. a 12 f optical system. The solution according to the invention is an improvement of the solution disclosed in WO2006/003077. In WO2006/003077 the pairs of reference beams are arranged along a line. According to the present invention they are arranged on a circle around the object beam in the Fourier plane. This arrangement allows two-dimensional multiplexing. Preferably at least four reference beams are provided, equally distributed along the circle. In this way the same equalization of the interhologram crosstalk is achieved in perpendicular multiplexing directions. The Advantageously, a beam generator generates the three or more reference beams from an incoming reference beam. The beam generator preferably is a diffractive element, e.g. a computer-generated hologram or a thick multiplexed hologram. This enables a very efficient generation of the three or more reference beams without the need for complicated optical components.

In case of a transmission type holographic storage medium the beam generator generates cone shaped reference beams. In case of a reflection type holographic storage medium, however, the beam generator advantageously generates half cone shaped reference beams. In this way a phase conjugated reconstruction of the object beam during reading is avoided. At the same time the overlap between the object beam and the reference beams is improved, which reduces the symbol error rate (SER) of the multiplexed holograms.

Advantageously a filter is located in a Fourier plane, which serves as a low-pass filter for the object beam and as a polarization rotating element for the three or more reference beams. For this purpose the filter preferably has a beam block with a central aperture for low-pass filtering the object beam and holes for the reference beams, and a ring type half wave plate for rotating the direction of polarization of the three or more reference beams with a central aperture for the object beam. Such a filter allows to easily couple the object beam and the reference beam into the optical system. At the same time, the filter enables a blocking of a zero order reference beam generated by a diffractive beam generator. Of course, the functions of low-pass filter and polarization rotating element can also be performed by two separate elements.

BRIEF DESCRIPTION OF THE DRAWINGS

For a better understanding the invention shall now be explained in more detail in the following description with reference to the figures. It is understood that the invention is not limited to this exemplary embodiment and that specified features can also be expediently be combined and/or modified without departing from the scope of the present invention. In the figures.

DETAILED DESCRIPTION OF PREFERRED EMBODIMENTS

Figure 1:
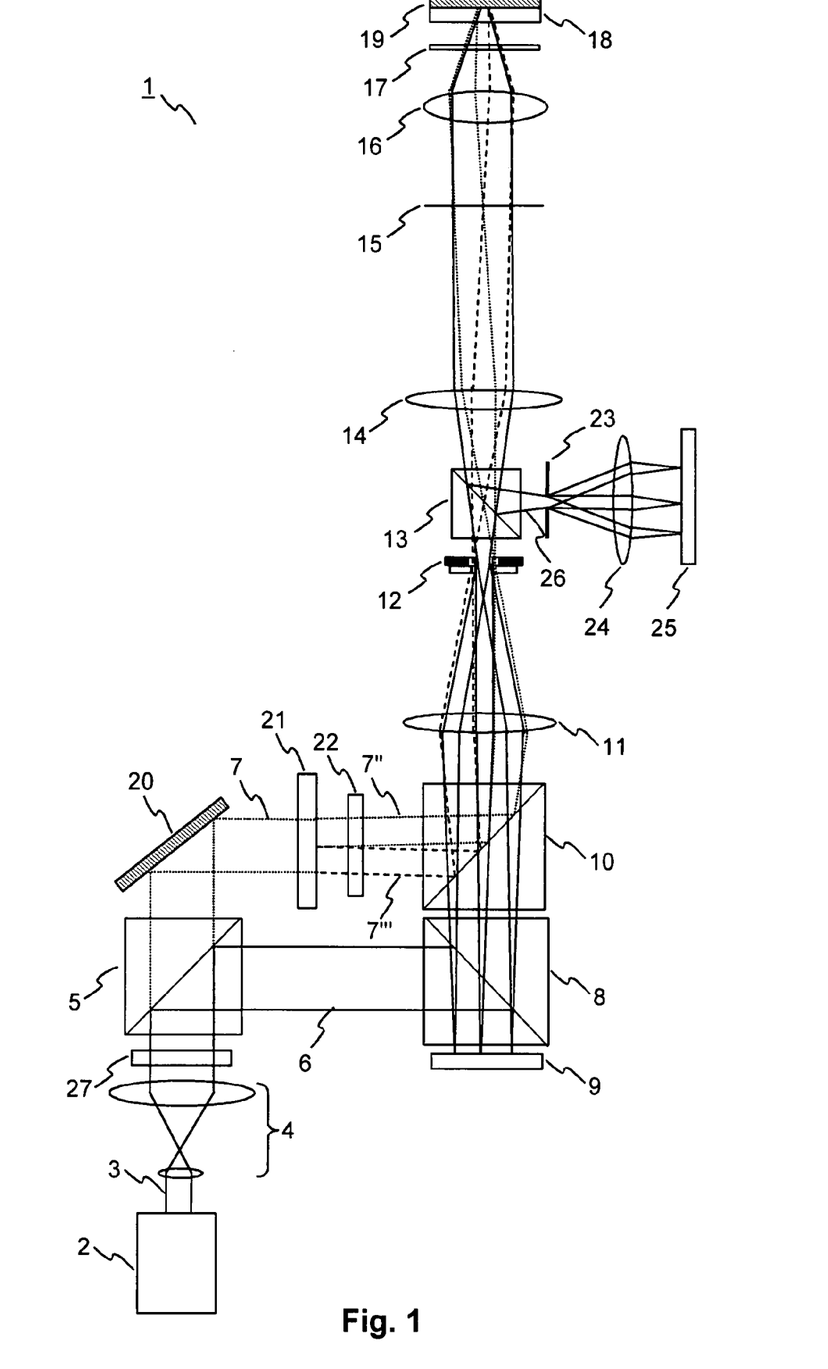
FIG. 1 illustrates a simplified setup of a coaxial reflection type holographic storage system according to the invention.

A simplified setup of a coaxial reflection type holographic storage system 1 according to the invention is illustrated in FIG. 1. For simplicity, an integrated servo system has been omitted in the figure. In the example the holographic storage system is a 12f system. A laser beam 3 emitted by a laser 2 is expanded by an optional beam expander 4 and divided into an object beam 6 and a reference beam 7 by a polarizing beam splitter (PBS) cube 5. A half wave plate 27 is located between the beam expander 4 and the PBS cube 5. The laser 2 emits a linearly polarized laser beam 3. By rotating the half wave plate 27 the polarization direction of the laser beam 3 can be rotate into an arbitrary direction. The PBS cube 5 divides the laser beam 3 into two orthogonal polarized (P and S polarized) laser beams 6, 7. The rotation of the half wave plate 27 allows to control the beam intensity ratio of the P and S polarized beams, or in other words the intensity ratio in the object arm and reference arm. For optimizing the readout diffraction efficiency it is desirable to optimize the intensity ratio during recording. The object beam 6 is directed onto a reflection type SLM 9 by a second PBS cube 8. After reflection from the SLM 9, the object beam 6 passes through the second PBS cube 8 and is combined with the reference beam 7 by a third PBS cube 10. The reference beam 7 is directed towards the third PBS cube 10 by a mirror 20. In the optical path of the reference beam there are a half wave plate 22 and a beam generator 21, e.g. a diffraction type beam generator. The beam generator 21, whose function will be explained in more detail below with reference to FIGS. 2 to 4, generates multiple reference beams 7", 7"'. As indicated before, the object beam 6 and the reference beams 7", 7"' are coupled into the main coaxial arrangement by the third PBS cube 10. Following this PBS cube 10 there is a first long focal length objective 11. Long focal length in this case means that the focal length is long enough to place additional optical components between the lens and the focus without having too much aberrations. Long focal length objectives have the advantage that their fabrication is simple and requires less optical elements. In addition, the diameter of the Fourier plane of a long focal objective is large, which simplifies the fabrication of filters placed into the Fourier plane as the fabrication tolerances are reduced. This first objective 11 generates the Fourier transform of the SLM 9 at the back focal plane of the first objective 11, which is the Fourier plane of the SLM. The first objective 11 also focuses the multiple reference beams 7", 7"' into the Fourier plane. Located in this Fourier plane is an in-coupling filter, which will be explained below with reference to FIG. 6. The in-coupling filter 12 is designed such that it low-pass filters the object beam 6 and rotates the polarization of the reference beams 7", 7'". After passing the in-coupling filter 12 the object beam 6 and the reference beams 7", 7'" pass through a fourth PBS cube 13. A second long focal length objective 14 after the PBS cube 13 retransforms the SLM image onto an intermediate object plane 15. A high NA Fourier objective 16, e.g. with NA≧0.6, transforms the SLM image onto a mirror layer 19 of a holographic storage medium 18. During writing the object beam 6 interferes within the holographic storage medium 18 with the direct reference beams 7", 7'" and the reference beams 7", 7'" reflected by the mirror layer 19. During reading a reconstructed object beam 26 is retransformed by the high NA Fourier objective 16 onto the intermediate image plane 15. A quarter wave plate 17 is located between the high NA Fourier objective 16 and the holographic storage medium 18. As the beams pass through this quarter wave plate 17 twice, the polarization direction of the reconstructed object beam 26 is orthogonal to the polarization direction of the original object beam 6. The reconstructed object beam 26 is again Fourier transformed by the second long focal length objective 14. Due to the rotation of the polarization, the PBS cube 13 reflects the reconstructed object beam 26 onto an out-coupling filter 23, which is located in the third Fourier plane of the 12 f system. The out-coupling filter 23 blocks the reference beams 7', 7'", thus only the reconstructed object beam 26 is imaged onto a detector array 25 by a third long focal length objective 24. In the figure the focal length of the objective 24 is different from the focal lengths of the objectives 11 and 14. The optical arrangement is a so-called afocal system. In an afocal systems a magnification or demagnification can be realized using objectives 11, 14, 24 with different focal lengths. In the present case a magnification can be realized between the SLM 9 and the intermediate object plane 15 by an appropriate choice of the focal lengths of the objectives 11 and 14, and also between the intermediate image plane (which corresponds to the intermediate object plane 15) and the detector 25 by an appropriate choice of the focal lengths of the objectives 14 and 24. The required magnification depends on the size of the SLM 9, the size of the detector 25, and the desired oversampling. Oversampling indicates how many detector pixels are assigned for one SLM pixel.

As an alternative to the reflection type SLM 9 a transmission type SLM can be used. In this case the second PBS cube 8 is replaced by a mirror. The transmission type SLM is preferably positioned between this mirror and the third PBS cube 10.

Figure 2:
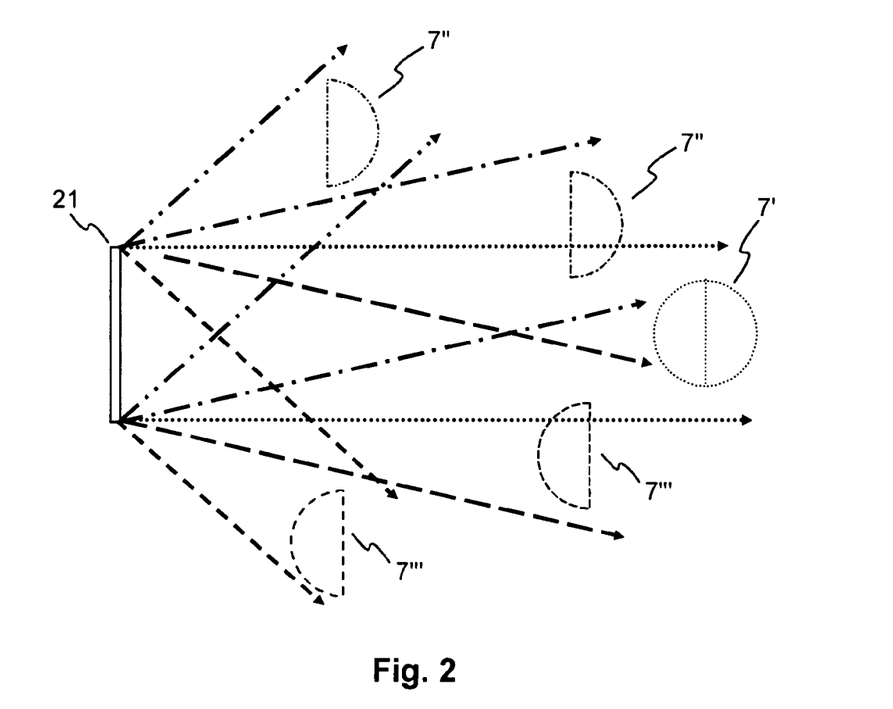
FIG. 2 depicts a reference beam generator and the generated reference beams.

FIG. 2 shows the reference beam generator 21 and the generated reference beams 7", 7'". For a reflection type holographic storage medium 18 the reference beam 7 is advantageously split into a plurality of half cone shaped reference beams 7', 7", 7". This is achieved, for example, by a diffractive element as the reference beam generator 21. The diffractive element is illuminated by a circular shape plane wave, and generates half cone shaped reference beams 7", 7'" in appropriate directions. In the figure the 3-dimensional half cones are represented by their half circle shaped cross sections. There are right-side half cones 7" and left-side half cones 7'". There also is a zero order reference beam 7' with a low diffraction efficiency. This reference beam 7' needs to be blocked within the further part of the optical system, which in the exemplary embodiment is achieved by the in-coupling filter 12 and the PBS cube 13. The diffractive element advantageously is a computer-generated hologram or a thick multiplexed hologram. In case of a transmission type holographic storage medium 18, the beam generator 21 advantageously generates cone shaped reference beams.

Figure 3:
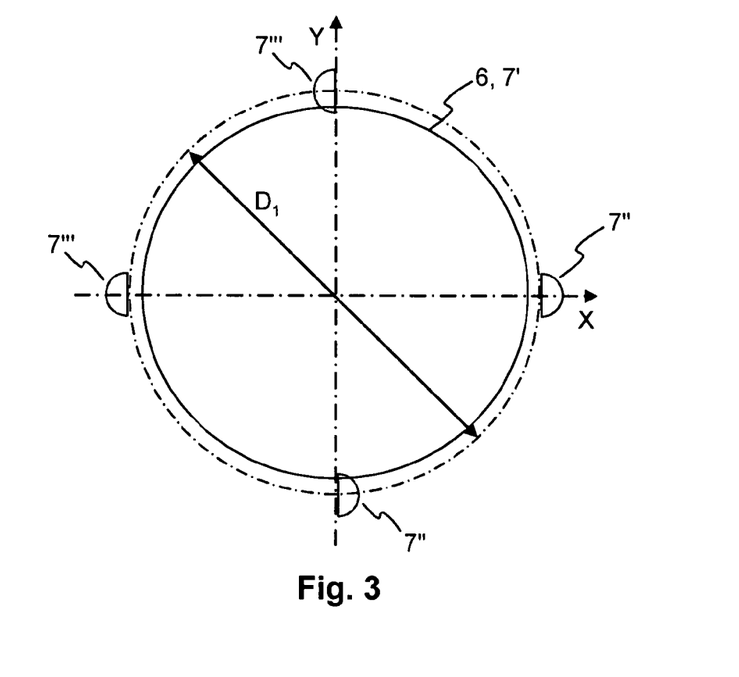
FIG. 3 shows the object beam and four half cone shaped reference beams after filtering near the Fourier plane.
Figure 4:
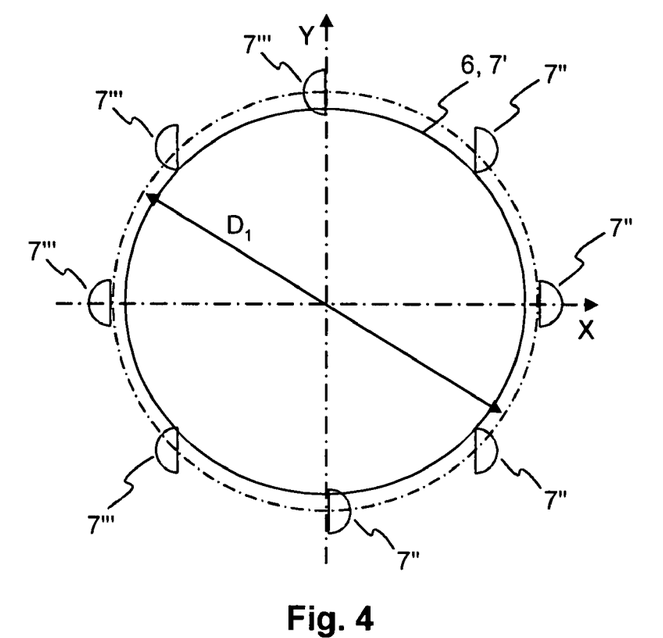
FIG. 4 shows the object beam and eight half cone shaped reference beams after filtering near the Fourier plane.

FIGS. 3 and 4 show the arrangement of the object beam 6 and the reference beams 7", 7'" just after filtering by the in-coupling filter 12 in the Fourier plane of the first objective 11. While FIG. 3 illustrates the case of four reference beams 7", 7'", FIG. 4 shows the case of eight reference beams 7", 7'". The object beam 6 is Fourier transformed and low-pass filtered at this plane. The reference beams 7", 7'" are arranged on a circle with a diameter $D_1$ around the object beam 6. In the exemplary embodiment of FIG. 1 the zero order reference beam 7' is not directly blocked by the in-coupling filter 12 and is located in the same area as the object beam 6.

Figure 5:
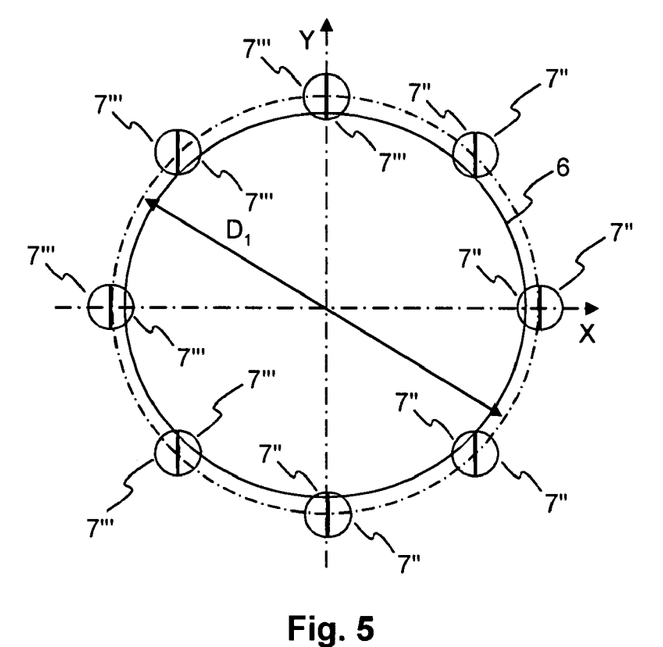
FIG. 5 depicts the object beam and eight combined double-half cone shaped reference beams near the Fourier plane.

As illustrated in FIG. 5, after the reflection at the mirror layer 19 of the holographic storage medium 18 the direct half cone reference beams 7", 7'" together with the reflected half cone reference beams 7", 7'" form complementary half cones, i.e. essentially complete cones. This means that in combination these beams have an essentially circular cross-section near the Fourier plane.

Figure 6:
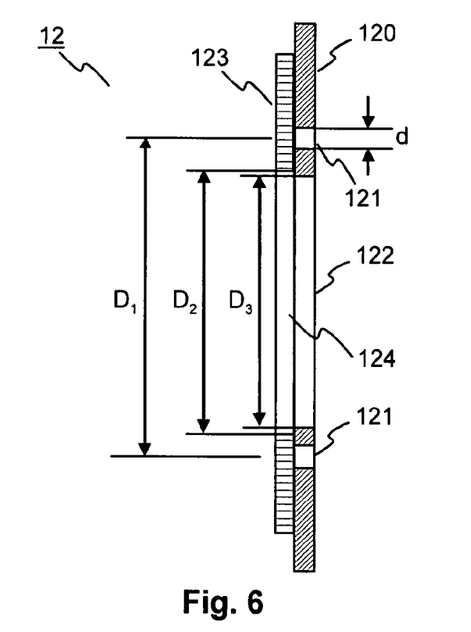
FIG. 6 shows a cross-sectional view of the in-coupling filter with the ring type half wave plate.

FIG. 6 shows a cross sectional view of the in-coupling filter 12 located in the first Fourier plane of the 12 f optical system. It includes a beam block 120, e.g. a thin black metal plate or a transparent substrate with a reflective or absorbent layer, with a central aperture 122 with a diameter $D_3$ for the object beam 6 and the zero order reference beam 7', and holes 121 with a diameter d for the reference beams 7", 7'". A ring type half wave plate 123 is arranged on the beam block 120. The ring type half wave plate 123 has a central aperture 124 with a diameter $D_2$. The object beam 6 and the zero order reference beam 7' pass through this central aperture 124 without any modification, and also pass through the central aperture 122 of the beam block 120. The central aperture 122 acts as a low-pass filter for the object beam 6, because it cuts the higher Fourier components of the object beam 6. The remaining reference beams 7", 7'" pass through the half wave plate 123, which rotates the direction of polarization of these beams 7", 7'". Before the first Fourier plane the directions of polarization of the object beam 6 and the reference beams 7', 7", 7'" are orthogonal. The ring type half wave plate 123 rotates the direction of polarization of the diffracted reference beam 7", 7'", while the low energy zero order reference beam 7' conserves its direction of polarization. Arranged on a ring with the diameter D1 around the central aperture 122 of the beam block 120 there are holes 121 for the diffracted reference beams 7", 7'". Thus the filter 12 in the first Fourier plane transmits the diffracted reference beams 7", 7'" as well as the zero order reference beam 7', and also transmits the low-pass filtered object beam 6. Because of the ring type half wave plate 123 the direction of polarization of the zero order reference beam 7' is orthogonal to the direction of polarization of the other beams 6, 7", 7'". Therefore, the PBS cube 13 after the filter 12 transmits the low-pass filtered object beam 6 and the diffracted reference beams 7", 7'" whereas it reflects the zero order reference beam 7' out of the optical system. In the figure the central aperture 122 is circular, which fits best to the circular apertures of the lenses of the optical setup. However, the aperture 122 may also be elliptical, e.g. when the tips of the reference beams 7" 7'" are arranged on an ellipse. Furthermore, the aperture may also have a square or rectangular shape, which fits better to the diffraction image of the SLM 9 with its square or rectangular pixels. The 121 for the reference beams 7", 7'" may be switchable apertures. This is advantageous for special multiplexing schemes. When the reference beam generator 21 generates M×N reference beams 7", 7'", and only M apertures are opened at the same time during recording, N different holograms can be recorded into the same volume of the storage material with N different arrangements of M reference beams.

Figure 7:
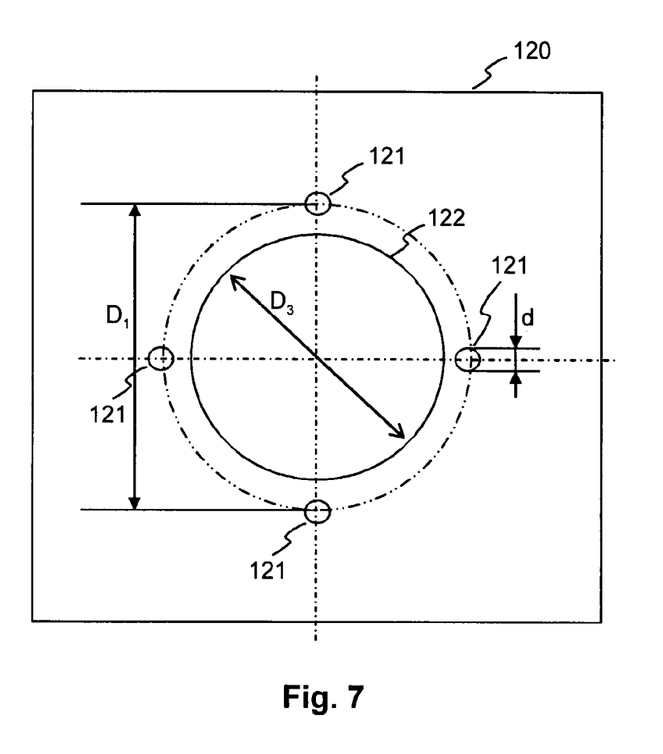
FIG. 7 shows a top view of the in-coupling filter in case of four reference beams.

FIG. 7 shows the top view of the beam block 120 of the in-coupling filter 12 for the case of four reference beams 7″ 7‴. The holes 121 for the reference beams 7″, 7‴ are arranged on a circle with the diameter $D_1$. The diameter of the central aperture 122 is $D_3$. The difference of the diameters $(D_1-D_3)$ is about 40-100 μm. The diameter d of the holes 121 for the reference beams 7″, 7‴ is about 10-100 μm. Of course the number of reference beams 7″, 7‴ is not limited to four or eight reference beams 7″, 7″. It is likewise possible to use more reference beams or even a ring type reference beam. However, the reference beams 7″, 7″ also overlap, which leads to the recording of noise gratings. The use of four or eight reference beams 7″, 7‴ is a tradeoff between the equalization of interhologram crosstalk and the disturbing effects of the noise gratings.

Figure 8:
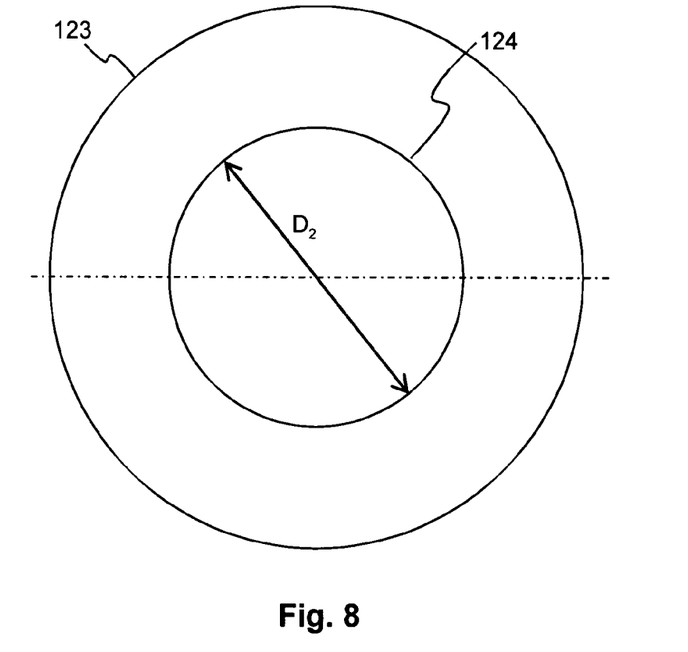
FIG. 8 depicts a top view of the ring type half wave plate.

FIG. 8 depicts a top view of the ring type half wave plate 123. The diameter of its central aperture 124 is $D_2$, where $D_2$ satisfies the relation $(D_1-d)>D_2>D_3$.

Figure 9:
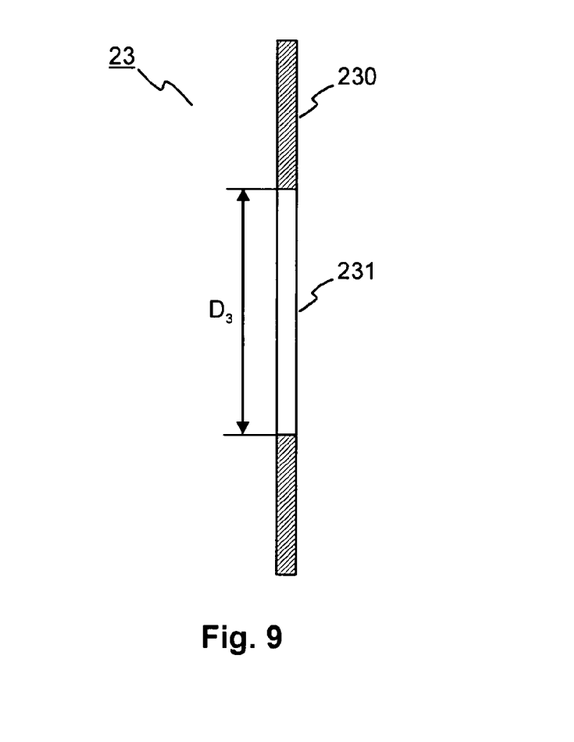
FIG. 9 shows a cross-sectional view of the out-coupling filter.

A cross-sectional view of the out-coupling filter 23 is illustrated in FIG. 9. The out-coupling filter 23 is located in the third Fourier plane of the 12 f system. The out-coupling filter 23 is a beam block 230 with a central aperture 231 with the diameter $D_3$.

Figure 10:
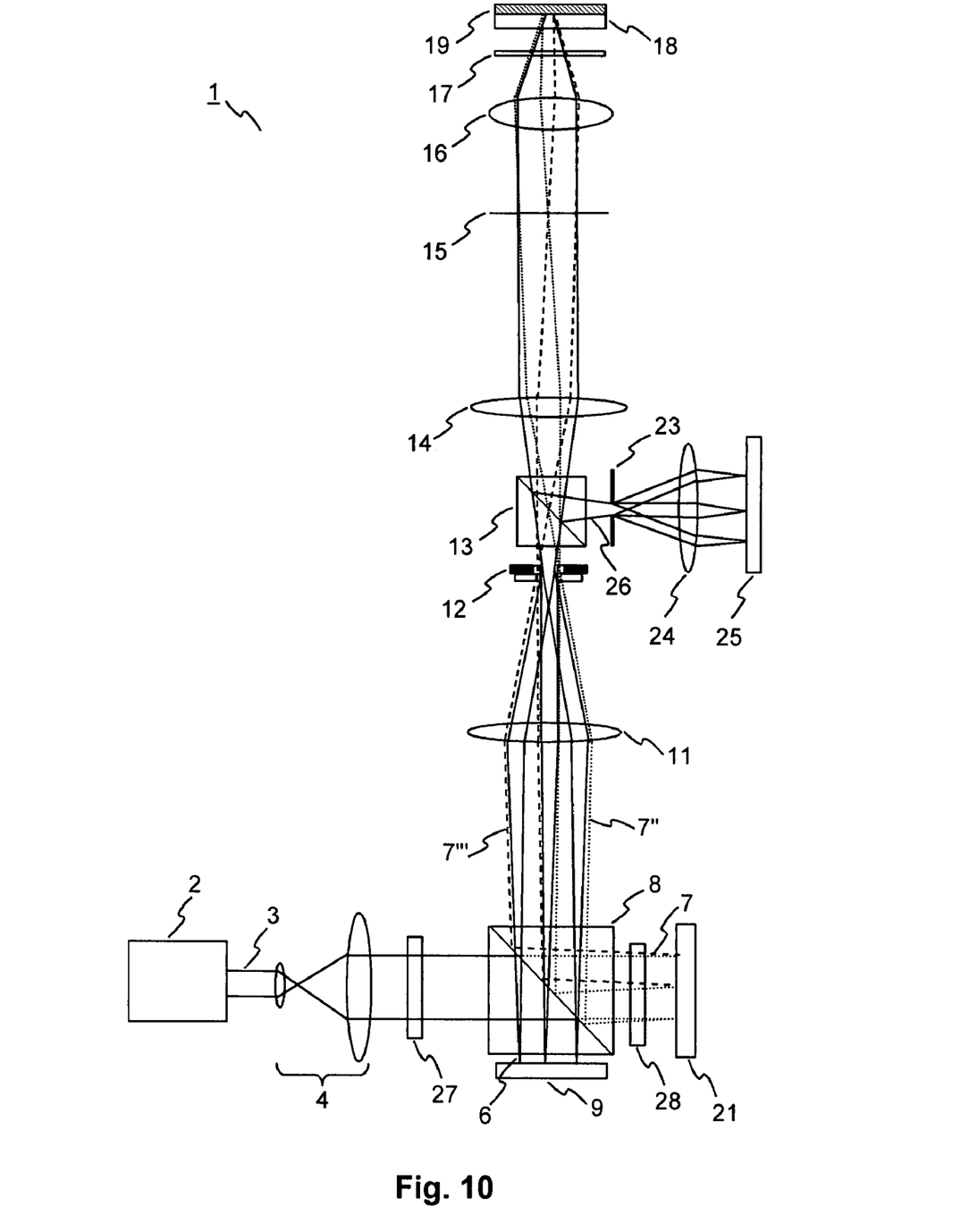
FIG. 10 depicts a modification of the setup of FIG. 1.

FIG. 10 shows a modification of the setup of FIG. 1. In this modified setup the reference beam generator 21 is a mirror type beam generator. As a consequence, the half wave plate 22 is replaced by a quarter wave plate 28. This setup has the advantage that the optical system is further simplified, as two PBS cubes and a mirror are no longer needed.

What is claimed is:

1. Apparatus for reading from a holographic storage medium, with a coaxial arrangement of three or more focused reference beams and a reconstructed object beam, the apparatus including:
    a Fourier objective for generating an image of the reconstructed object beam in an intermediate image plane;
    an objective for generating a Fourier transform of the image of the reconstructed object beam in a Fourier plane; and
    an out-coupling filter located in the Fourier plane for blocking the reference beams and transmitting the reconstructed object beam,
    wherein the foci of the focused reference beams are arranged on a circle around the object beam in the plane of the out-coupling filter.

2. Apparatus according to claim 1, having a beam generator for generating the three or more reference beams from an incoming reference beam.

3. Apparatus according to claim 2, wherein the beam generator is a diffractive element.

4. Apparatus according to claim 2, wherein the holographic storage medium is a reflection type medium and the beam generator generates half cone shaped reference beams.

5. Apparatus according to claim 2, wherein the holographic storage medium is a transmission type medium and the beam generator generates cone shaped reference beams.

6. Apparatus according to claim 1, having a filter located in a Fourier plane for low-pass filtering the object beam and for rotating the direction of polarization of the three or more reference beams.

7. Apparatus according to claim 6, wherein the filter has a beam block with a central aperture for low-pass filtering the object beam and holes for the reference beams, and a ring type half wave plate for rotating the direction of polarization of the three or more reference beams with a central aperture for the object beam.

8. Filter for a central light beam and three or more light beams arranged on a circle around the central light beam, wherein it is a low-pass filter for the central light beam and a polarization rotating element for the three or more light beams.

9. Filter according to claim 8, having a beam block with a central aperture with a third diameter and holes arranged on a circle with a first diameter around the central aperture, and a ring type half wave plate with a central aperture with a second diameter larger than the third diameter.

10. Apparatus for writing to a holographic storage medium, with a coaxial arrangement of three or more focused reference beams and an object beam, and with an in-coupling filter located in a Fourier plane for low-pass filtering the object beam, wherein the foci of the focused reference beams are arranged on a circle around the object beam in the plane of the in-coupling filter.

11. Apparatus according to claim 10, having a beam generator for generating the three or more reference beams from an incoming reference beam.

12. Apparatus according to claim 11, wherein the beam generator is a diffractive element.

13. Apparatus according to claim 11, wherein the holographic storage medium is a reflection type medium and the beam generator generates half cone shaped reference beams.

14. Apparatus according to claim 11, wherein the holographic storage medium is a transmission type medium and the beam generator generates cone shaped reference beams.

* * * * *